(12) United States Patent
Ranalli et al.

(10) Patent No.: US 8,462,366 B2
(45) Date of Patent: *Jun. 11, 2013

(54) DELIVERY EXPERT SYSTEM, METHOD AND COMPUTER PROGRAM PRODUCT

(75) Inventors: Douglas J. Ranalli, Cambridge, MA (US); Robert Huebner, Topsfield, MA (US); Valerie Louise Johns, Wellesley, MA (US); Shelley J. Ranalli, Cambridge, MA (US); Lori Baumgartner, Burlington, MA (US); Diana Li, Woburn, MA (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/410,940

(22) Filed: Mar. 2, 2012

(65) Prior Publication Data

US 2012/0162695 A1 Jun. 28, 2012

Related U.S. Application Data

(63) Continuation-in-part of application No. 13/160,346, filed on Jun. 14, 2011, now Pat. No. 8,154,757, which is a continuation of application No. 13/110,795, filed on May 18, 2011, now Pat. No. 8,149,445, which is a continuation of application No. 12/535,606, filed on Aug. 4, 2009, now Pat. No. 7,961,344, which is a continuation of application No. 11/828,408, filed on Jul. 26, 2007, now abandoned, which is a continuation of application No. 10/662,858, filed on Sep. 15, 2003, now Pat. No. 7,265,861, which is a continuation of application No. 08/739,625, filed on Oct. 29, 1996, now Pat. No. 6,747,761.

(51) Int. Cl.
*H04N 1/00* (2006.01)
*G06F 3/12* (2006.01)
*G06K 15/00* (2006.01)

(52) U.S. Cl.
USPC ........ 358/1.14; 358/1.12; 358/1.13; 358/1.15

(58) Field of Classification Search
USPC ............. 358/1.15, 2.1, 2.99, 3.01, 3.12, 3.13, 358/529, 518, 534, 1.13, 400, 401, 404, 444, 358/434, 435, 1.14
See application file for complete search history.

(56) References Cited

U.S. PATENT DOCUMENTS

| | | | |
|---|---|---|---|
| 4,991,204 | A | 2/1991 | Yamamoto et al. |
| 4,994,926 | A | 2/1991 | Gordon |

(Continued)

FOREIGN PATENT DOCUMENTS

| | | |
|---|---|---|
| EP | 0 400 771 A2 | 12/1990 |
| JP | 64-081453 | 3/1989 |

(Continued)

OTHER PUBLICATIONS

Office Action for U.S. Appl. No. 13/437,612, mailed Sep. 20, 2012, 7 pgs.

(Continued)

*Primary Examiner* — Jerome Grant, II
(74) *Attorney, Agent, or Firm* — Sprinkle IP Law Group

(57) ABSTRACT

Embodiments disclosed herein can facilitate delivery of a document from a source to a destination over a network where an initial delivery attempt has been unsuccessful. Actions to be taken are based upon input conditions which may include a time-variable set of input conditions such as identifying non-business days and/or hours at the destination. The document can be a fax, an email, or a voice mail. The actions may include resubmitting the document to the network for a next delivery attempt, cancelling the document, sending a request to the source or destination for additional delivery information, identifying the destination as a technical problem, or a combination thereof.

20 Claims, 22 Drawing Sheets

U.S. PATENT DOCUMENTS

| | | | |
|---|---|---|---|
| 5,065,426 | A | 11/1991 | Greenstein et al. |
| 5,237,428 | A | 8/1993 | Tajitsu et al. |
| 5,291,302 | A | 3/1994 | Gordon et al. |
| 5,398,277 | A | 3/1995 | Martin, Jr. et al. |
| 5,552,901 | A | 9/1996 | Kikuchi et al. |
| 5,608,786 | A | 3/1997 | Gordon |
| 5,782,687 | A | 7/1998 | Sniegocki |
| 5,790,639 | A | 8/1998 | Ranalli et al. |
| 5,802,271 | A | 9/1998 | Hashimoto et al. |
| 5,805,299 | A | 9/1998 | Sakayama et al. |
| 5,832,455 | A | 11/1998 | Hayashi et al. |
| 6,215,765 | B1 | 4/2001 | McAllister et al. |
| 6,747,761 | B1 | 6/2004 | Ranalli et al. |
| 7,265,861 | B1 | 9/2007 | Ranalli et al. |
| 7,961,344 | B2 | 6/2011 | Ranalli et al. |
| 8,149,445 | B2 | 4/2012 | Ranalli et al. |
| 8,154,757 | B2 | 4/2012 | Ranalli et al. |
| 2002/0176117 | A1 | 11/2002 | Randalli et al. |
| 2003/0117667 | A1 | 6/2003 | Eguchi |
| 2012/0188607 | A1 | 7/2012 | Ranalli et al. |

FOREIGN PATENT DOCUMENTS

| | | |
|---|---|---|
| JP | 04-212564 | 4/1992 |
| JP | 05-048811 | 2/1993 |
| JP | 05-083514 | 4/1993 |
| JP | 05-304569 | 11/1993 |
| JP | 05-327952 | 12/1993 |
| JP | 08-079298 | 3/1996 |
| JP | 10-329650 | 12/1998 |
| JP | 11-308430 | 11/1999 |

OTHER PUBLICATIONS

Notice of Allowance for U.S. Appl. No. 13/437,612, mailed Jan. 11, 2013, 3 pgs.
Office Action for U.S. Appl. No. 10/662,858, mailed Mar. 23, 2005, 22 pgs.
Office Action for U.S. Appl. No. 10/662,858, mailed Oct. 12, 2005, 19 pgs.
Office Action for U.S. Appl. No. 10/662,858, mailed Mar. 31, 2006, 21 pgs.
Notice of Allowance for U.S. Appl. No. 10/662,858, mailed May 3, 2007, 4 pgs.
Office Action for U.S. Appl. No. 12/535,606, mailed Oct. 26, 2010, 8 pgs.
Notice of Allowance for U.S. Appl. No. 12/535,606, mailed Feb. 9, 2011, 6 pgs.
Office Action for U.S. Appl. No. 13/110,795, mailed Jul. 20, 2011, 12 pgs.
Office Action for U.S. Appl. No. 13/160,346, mailed Aug. 18, 2011, 15 pgs.
Notice of Allowance for U.S. Appl. No. 13/110,795, mailed Dec. 1, 2011, 10 pgs.
Notice of Allowance for U.S. Appl. No. 13/160,346, mailed Dec. 8, 2011, 6 pgs.
Office Action for U.S. Appl. No. 08/739,625, mailed Mar. 23, 1998, 9 pgs.
Office Action for U.S. Appl. No. 08/739,625, mailed Dec. 7, 1998, 11 pgs.
Office Action for U.S. Appl. No. 08/739,625, mailed Feb. 26, 2001, 12 pgs.
Office Action for U.S. Appl. No. 08/739,625, mailed Jul. 17, 2002, 10 pgs.
Office Action for U.S. Appl. No. 08/739,625, mailed Jan. 2, 2003, 15 pgs.
Notice of Allowance for U.S. Appl. No. 08/739,625, mailed May 5, 2003, 8 pgs.
Office Action for U.S. Appl. No. 09/226,899, mailed Oct. 25, 2001, 8 pgs.
Office Action for U.S. Appl. No. 09/226,899, mailed Mar. 10, 2003, 7 pgs.
Office Action for U.S. Appl. No. 11/828,408, mailed Feb. 4, 2009, 12 pgs.

DELIVERY EXPERT SYSTEM, METHOD AND COMPUTER PROGRAM PRODUCT

CROSS-REFERENCE TO RELATED APPLICATIONS

This application is a continuation of U.S. patent application Ser. No. 13/160,346, filed Jun. 14, 2011, now U.S. Pat. No. 8,154,757, which is a continuation of U.S. patent application Ser. No. 13/110,795, filed May 18, 2011, now U.S. Pat. No. 8,149,445, which is a continuation of U.S. patent application Ser. No. 12/535,606, filed Aug. 4, 2009, now U.S. Pat. No. 7,961,344, which is a continuation of U.S. patent application Ser. No. 11/828,408, filed Jul. 26, 2007, now abandoned, which is a continuation of U.S. patent application Ser. No. 10/662,858, filed Sep. 15, 2003, now U.S. Pat. No. 7,265,861, which is a continuation of U.S. patent application Ser. No. 08/739,625, filed Oct. 29, 1996, now U.S. Pat. No. 6,747,761, all of which are incorporated herein by reference.

TECHNICAL FIELD

This disclosure concerns delivery of facsimile (fax) documents over a value added network, such as a store-and-forward network, and more particularly to an automated and integrated method and apparatus to facilitate delivery of a fax document after an initial delivery attempt is unsuccessful.

BACKGROUND

As a mechanism to carry information over long distances, store-and-forward (S&F) networks offer an efficient, low-cost alternative to the existing public switched telephone network (PSTN). In general, S&F networks operate parallel to, and are accessed by, the PSTN.

FIG. 1 shows schematically PSTN 30 and S&F network 80 connected in parallel between a source fax machine 10 and a destination fax machine 70. An autodialer 12, positioned between the source fax machine and PSTN 30, designates incoming faxes for transmission over either the PSTN 30 or S&F network 80. If for example the destination of the incoming fax is not one serviced by the S&F network, then the autodialer dials the destination fax number directly to the local exchange 32; the call is then carried in a normal fashion by the PSTN 30 to the destination fax machine 70. In contrast, if the number is one serviced by the S&F network, the autodialer dials the telephone number corresponding to that of the source network node 20. The local exchange 32 then routes the call through the PSTN to the source node. (Note that, depending upon their proximity, the source fax machine 10 and the source network node 20 maybe served by the same or different local exchanges.) Once it has completely received the document, the source node 20 transfers it to the destination network node 40 over dedicated circuit 60. At this point, the destination node 40 dials the destination fax number to its local exchange 36 which in turn transfers the call via the PSTN to the destination fax machine 70. (Note again that, depending upon their proximity, the destination fax machine 70 and the destination network node 40 may be served by the same or different local exchanges.)

In summary, transport of information from the source fax machine to the destination fax machine using the S&F network requires three distinct steps:
(1) from the source fax machine to the source network node via the PSTN;
(2) from the source node to the destination node via dedicated circuits; and
(3) from the destination node to the destination fax machine, again via the PSTN.

Store-and-forward networks offer a number of significant advantages over standard telephone networks for transport of facsimile. For example, a fax document can be carried 16 times more efficiently using packet technology employed by S&F networks. A common annoyance in telephony is the inability to complete a call, usually because the destination device is busy or does not answer. Although sophisticated voice mail systems have been designed to overcome this problem in voice telephony, similar practical and cost effective solutions do not exist for fax. S&F networks offer a viable solution. A properly implemented S&F network will employ a sufficiently large number of telephone circuits such that a customer fax machine never encounters a busy signal. At the destination end, it is a common practice to design into S&F networks the ability to automatically redial those call attempts which encounter "busy" or "no-answer" signals. Normally, the calls are redialed periodically over a fixed interval of time, every ten minutes for a half hour, for example.

Since multiple messages are typically coursing through an S&F network at any point in time, it is important to have some mechanism to monitor the location and status of each. For example, in one known S&F network, a small data file called an envelope is created to track each fax document as it moves through the network. The source node creates the envelope after it receives an incoming fax document. As the fax document moves through the network, the envelope moves between the network devices and receives continuous updates regarding the status of the fax. This enables substantially real-time monitoring of the fax delivery process.

In the known S&F network, upon concluding the delivery attempt process, the destination network node declares the fax document either "delivered" or "not delivered"; it records the status in the corresponding envelope which is then returned to the source node. If the delivery was successful, the envelope is forwarded to a historical database (HD) which provides a basis for constructing customer bills. If the delivery was not successful, the envelope is forwarded to a delivery assist system (DAS) for further processing. DAS is a database management system which provides a human operator, the document delivery analyst, with the delivery history and options for resubmission to the network of the document in question. One of the possible actions the analyst may take is to assign the fax document to an alternate destination number, i.e., one provided by either the sender or the receiver.

While the delivery analyst (human operator) enables the network provider to arrange delivery of most fax documents, and to provide the customer with an on-going report on alternative delivery attempts, the cost of providing such services are substantial. Furthermore, as the amount of traffic on the network increases, the number of documents requiring assistance increases, and it becomes more and more difficult to provide such human-assisted delivery on a timely and cost-effective basis.

The alternative delivery attempts which the prior art network can make by itself to deliver a document are quite limited. For example, a fax card with hard coded instructions may be provided in each network node which, based on call progress tones heard on the network, may institute an automatic retry. The sounds which may be heard include:
ring, no answer;
busy;
voice.

Generally, the device automatically retries a number of times in a given time period or cycle, e.g., every five minutes for a half hour, and if delivery is still unsuccessful, the document is transferred to a human analyst.

Thus, the prior art automatic retry device provides a fixed response based on a response received to a first delivery attempt. This system has limited utility and most documents with delivery problems end up being sent to a human analyst. As previously indicated, the cost of providing such human analysts are escalating as the amount of network traffic steadily increases.

SUMMARY

A method is provided for facilitating delivery of a fax document from a source to a destination over a network, when an initial delivery attempt has been unsuccessful. The method includes the step of initiating a rule-based process to determine a next action based on a time-variable set of input conditions to the process.

For example, the input conditions may be determined from one or more of:
destination;
source;
database of past delivery attempts; and
human analyst.

Based on these input conditions, the process determines a next action which causes a next delivery attempt, and if the next delivery attempt is not successful, the process is repeated.

The next action may include one or more of:
resubmitting the fax document to the network for a next delivery attempt;
canceling the document;
sending a request to the source or destination for additional delivery information; and
identifying the destination as having a technical problem.

Where additional information is requested, the responses received are a further input condition and the process then redetermines a next action based on the new input conditions.

In particular embodiments, the input conditions may include an identification of non-business days at the destination. The non-business days may be categorized by one or more of the country (in which the destination is located), region, and destination number. Input conditions may also include an identification of the non-business hours at the destination.

The process may be implemented by traversing a hierarchical decision tree, namely a data structure graph with one starting point known as a root and many end points known as leaves. Rules control the movement through the decision tree. The rules determine where to get information and how to compare that information to pick an appropriate path in the decision tree. An action is a leaf of the decision tree.

The rules consist of two parts, conditions and actions. Once a condition is met, an action or series of actions is triggered. The hierarchical tree may be constructed as a series of hierarchical tables, wherein each table will contain a set of rules with unique conditions. The top rule table will be searched first to determine if a corresponding condition can be matched. Once a match is found, the system will then handle the document accordingly.

The input conditions consist of attributes equaling a certain value. Some of the common attributes which may be used are response, cycle, destination business hours, delivery instruction, past action taken, and alternative network tried. Generally, the conditions will be unique such that each situation will find only one or no matches in a particular table.

In accordance with the apparatus disclosed herein, an integrated and automated document handling system is provided for facilitating delivery of a fax document from a source to a destination in a network. The system includes an automated rule-based process for determining an action based on a set of time-variable input conditions. The input conditions may be derived from one or more of the destination, the source, a database of past delivery attempts, and a human analyst. The output from the rule-based process causes a predetermined action based on a predetermined set of input conditions.

These and other features and benefits of the disclosure will be more particularly described in regard to the following detailed description and figures.

DETAILED DESCRIPTION

One of the major advantages of the delivery expert system (DES) and method disclosed herein is a reduction in the cost associated with documents requiring assisted delivery. The system is automated in that a document is owned by the delivery expert system and comes out of automation only for steps that need human intelligence and then automatically goes back to the control of the delivery expert system.

Decisions are made by the DES based on rules. Rules consist of two parts, conditions and actions. Once a condition is met an action or series of actions is triggered. Each table will contain a set of rules with unique conditions. When an envelope associated with a non-delivered document enters the DES, an attempt is made to match the non-delivery condition with a corresponding condition in the rule table. Once a match is found, the DES will then handle the document accordingly. If no match is found, DES passes the envelope on to a delivery analyst. The system is designed to be robust and scalable.

Figure 1:
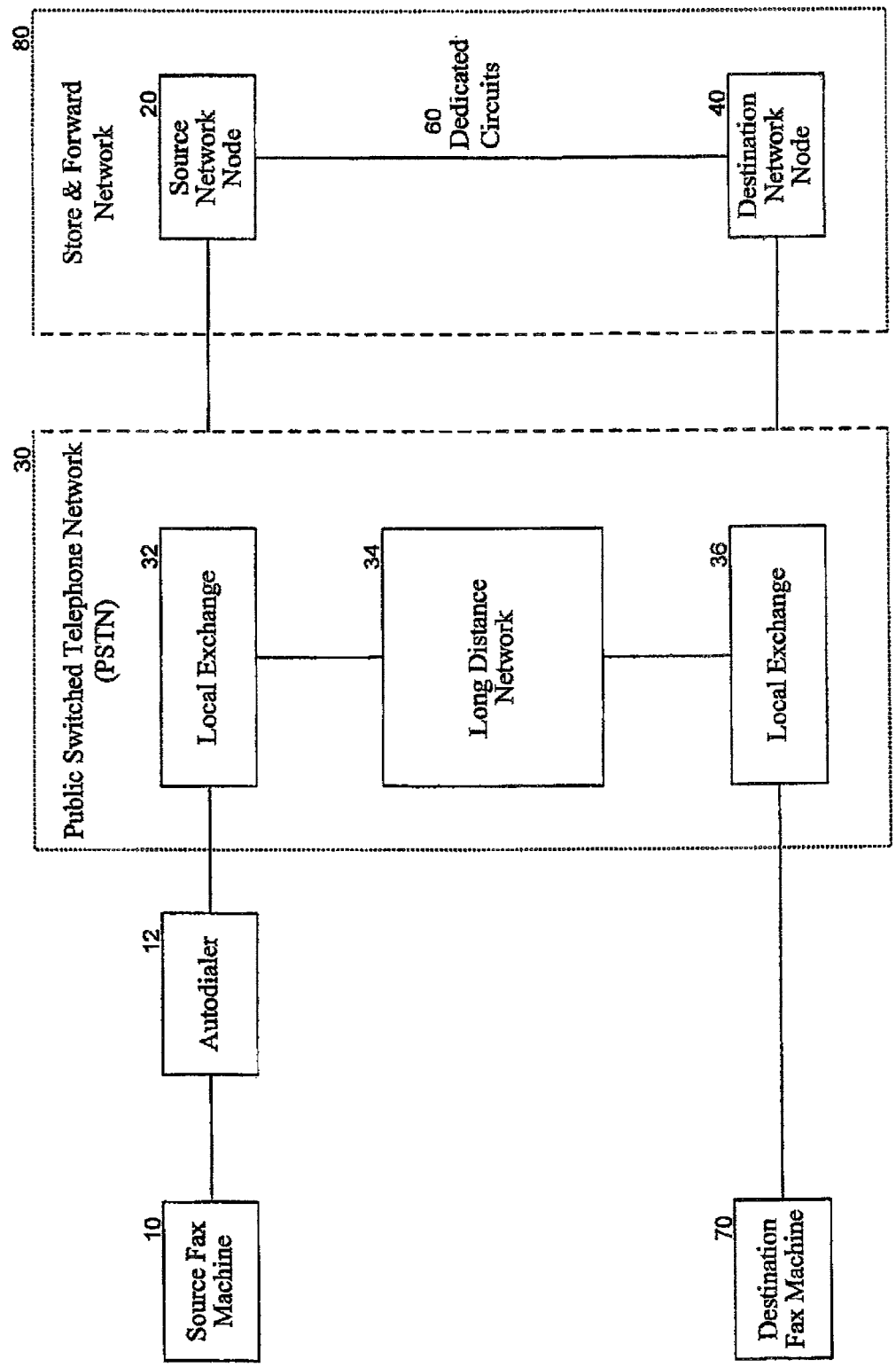
FIG. 1 is a schematic illustration of an S & F network disposed in parallel to a PSTN.
Figure 2:
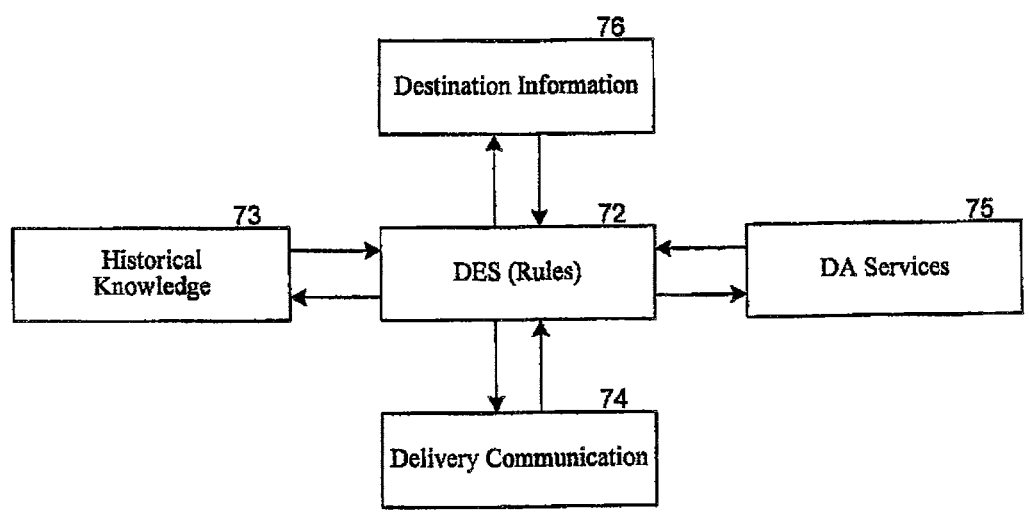
FIG. 2 is a schematic illustration of a delivery expert system (DES), which includes a rule-based process which receives input conditions from other components of the system and determines a next action for facilitating delivery of a fax document.

FIG. 2 is a schematic illustration of the integrated and automated nature of the system. The rule-based process is located in the center box 72, surrounded by four components which provide both inputs to the rule-based process, denoted by arrows directed toward the center box, and outgoing actions, directed to one of the four outer boxes.

The left hand box 73, designated "Historical Knowledge", is a database of past delivery information. This embodiment includes historical records which describe all past delivery attempts of all documents to a given destination number. Also included are records describing the past delivery attempt (cycle) of a given document. This information is provided by the envelope created for each fax document as it enters the network and which is updated with delivery information as the document travels through the network. The historical knowledge (prior delivery information) comprises the input conditions that are supplied to the rule-based process for determining a next action.

The lower box 74 designated "Delivery Communication" includes requests sent to the source or destination for additional delivery information, and the response thereto; again it provides additional input conditions to the rule-based process. For example, a source (customer) may be contacted via fax with a request to provide an alternative number for the destination of a non-delivered document. The rule-based process may automatically initiate the generation of such request when certain conditions are met during traversal of the rule-based decision tree. Generally, the response would be provided to both the rule-based process and to the historical knowledge database.

Another possible input condition is a new delivery instruction (NEW DI) sent by the customer (with or without a request). Upon receipt, the rule-based process may automatically flag all documents affected by the NEW DI so that the NEW DI is implemented as the next action (before traversing the other portions of the decision tree). For example, in a particular embodiment, a process scans a database of NEW DI records to determine if any new delivery information is available. The search is based on any delivery information that has been added to the system since the last time a given record was modified. If new information is found, the record is placed in a delivery assist envelope table with a status of "NEW DI". This record is then sent to the DES rules engine to determine an appropriate action based on the new information.

The right-hand box 75 designated "DA Services" represents all steps that a delivery analyst (human operator) may take and then pass his/her findings to the DES. These steps may be separated into three categories: (1) steps which require the delivery analyst to gather more information so that the DES can make the next decision; (2) steps which require the delivery analyst to take action outside a document, such as sending a request to a destination or source for further information; and (3) steps where the conditions are not yet defined in the rules and a document will need to be manually handled.

In the first category, where the delivery analyst gathers more information which it passes back to the DES, there are included the process steps of investigation, research and technical. Investigation is a step where a fax number is called because an unidentified response needs clarification. For example, the DES passes a document to DA services because of a rule that says to pass back undefined voice responses with an investigate status. The delivery analyst then calls the fax number and if he/she hears an "out-of-service" recording, the delivery analyst redefines the response to be an "out-of-service" recording, and passes this response back to the DES. The DES then finds the appropriate rule to handle "out-of-service recording" documents and the DES takes the appropriate action.

In another example, the human operator may call a fax number and the response is a live person. In this case, the investigation turns into research and all information listed under research needs to be passed back to the DES.

Research is the step where a voice number is called to research the cause of a failed delivery attempt and determine a solution. For example, the delivery analyst may call a voice number and get an alternate fax number. The delivery analyst will then type in the alternate fax number and pass the information to the DES that research is complete with an alternate number. The DES would then immediately resubmit the document to the alternate number based on the rules. Alternatively, if the delivery analyst had called the voice number and got no answer, the delivery analyst would pass to the DES that he/she got no answer. The DES would then, based on the predefined rules, retry the document for a certain period until the next condition to research again or another action came up.

Note that investigate and research could happen at the same time so the system must be able to pass all appropriate information back no matter what was the original reason the DES contacted the delivery analyst.

Technical is the step where certain documents need to be passed to a delivery analyst for control because of technical problems. As an example, there are areas of India where a fax tone sounds like a busy signal (to a U.S. human analyst). This region should be flagged proactively so that any documents going to this region will be automatically retrieved and appropriate pauses added to the dialing pattern to insure delivery to the destination number.

In other cases, a document having a technical problem may be flagged on a reactive basis. For example, a document for which the network provider continually receives a broken connection response on the same page is often due to the page having too many scan lines. In this case, the delivery analyst will call the customer and request that the page be resent.

Returning to FIG. 2, the upper box 76 designated "Destination Information" includes a database known as the World Fax Phone Book which includes alternative delivery instructions. In addition, there is provided an electronic calendar which tracks holidays for every country in the world, and a business hours system that tracks the standard business hours for every country in the world. In a preferred embodiment, the holidays and/or business hours are recorded at different levels, such as based on the region, country, or individual destination number.

By way of example, every December, the director of document delivery (human operator) executes a process to input holiday dates for the upcoming year. The default holidays, for which the dates do not vary from year to year, are automatically carried forward from the preceding year. Holidays that do not fall on the same date each year must be updated manually by entering the appropriate date. Each record, accessible by the user, may include the country, year, holiday date, and description, as set forth in the following examples; two records are shown, the first being the result of querying based on country, and the second being the result of querying based on date:

Results of querying on COUNTRY:

| Holiday Tracking Country: USA Year: 1996 | |
| --- | --- |
| Holiday Dates | Description |
| Jan. 1, 1996 | New Year's Day |
| May 30, 1996 | Memorial Day |
| Jul. 4, 1996 | July 4th |
| Sep. 1, 1996 | Labor Day |
| Nov. 24, 1996 | Thanksgiving |
| Feb. 25, 1996 | Christmas Day |
| ... | |

Results of querying on DATE:

| Holiday Tracking Date: Jan. 1, 1996 | |
| --- | --- |
| Country | Description |
| U.S.A. | New Years Day |
| Japan | New Years Day |
| Canada | New Years Day |

Similarly, the country business hours tracking system allows the document manager to specify standard business hours for every country (region and/or destination) in the world. The record specifies the hours the businesses are open versus closed for each day of the week. By specifying an open or closed value for each of the 24 hours, this provides flexibility in specifying odd closure hours (that is, lunch, half days on weekends, etc.). The user may query this information based on country and/or day of the week. A sample record is set forth below where O=open and C=closed:

| Business Hours Day of the Week: MONDAY | | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- |
| Country | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| USA | C | C | C | C | C | C | C | O | C | O | O | O | O | O | O | O | O | O | O | O | C | C | C | C |
| Korea | C | C | C | C | C | C | C | O | C | O | O | O | O | O | O | O | O | O | O | O | C | C | C | C |
| Italy | C | C | C | C | C | C | O | O | C | O | O | O | O | O | O | O | O | O | O | O | C | C | C | C |
| Japan | C | C | C | C | C | C | C | O | C | O | O | O | O | O | O | O | O | O | O | O | C | C | C | C |

In a particular embodiment described herein, the delivery expert system may be implemented as a network server with the following four components:
service entity;
management agent;
network API;
database API.

The service entity contains the rule-based process and is responsible for receiving envelopes, determining courses of action, and carrying out the actions. The supported actions may include:
Defer Delivery—Defers the attempted delivery until a later time.
Resubmit Document—Resubmit the document for delivery. The document can also be routed to an alternate network.
Terminate Document—Stop attempting delivery.
Schedule Request—Schedule a request for additional delivery information and send to source or destination.
Insert into Historicals Table—Inserts the envelope data into the business systems historicals table.
Insert into Non-Deliv Table—Inserts the envelope into the business systems' non-deliv table for delivery assistance.

As stated earlier, rules consist of two parts, conditions and actions. Once a condition is met an action or series of actions is triggered. Each table will contain a set of rules with unique conditions. When a failed delivery attempt occurs, the top rule table will be traversed until a corresponding condition can be matched. Once a match is found the DES will then handle the document accordingly.

Conditions consist of attributes or parameters equaling a certain value. Some of the common attributes include response, cycle, destination business hours, instruction type, past actions taken, and alternative network tried.

The values of attributes will use common logical signs such as equal, does not equal, greater than, less than, as well as a fixed number or text string. In addition, the value of attributes utilize true and false logic. For example, in order to see if a broken connection is occurring on the last page of a document, the condition can be set up as:
attribute: "maximum pages delivered"
value: "total pages—1"

Conditions are unique in that each finds only one or no matches in a table. A met condition evokes an action. Some actions involve actual handling of the document such as resubmitting the document to the network or sending the document to a delivery analyst; other actions may trigger the sending of a request to a customer or destination for additional delivery information. Multiple actions may take place.

An action can be placed on "hold" (i.e., deferred) until it is triggered by a future event or time. This is illustrated in greater detail by the examples below.

Instead of putting all of the rules into one huge table, it is easier to organize the rules into several tables based on the conditions in that table. When a document needs delivery assistance, the process will search the first table to see if there is a matched condition. If the condition is matched the appropriate action would be taken; if not, the DES would then search the next table.

In one example, three types of tables may be provided in a hierarchy. For example, a standard rules table may be set proactively (i.e., prior to this specific document experiencing a problem). The table may be traversed in the following sequence:
destination number;
country or region;
general default.

The general default table would be used for most cases.

As an additional example, a temporary rule table may be based on temporary instructions received from the customer on how to handle this particular document or destination number. Again, there may be three tables accessed in the following sequence:
  document;
  customer and destination number;
  destination number.

The rules may be set up by the delivery analyst while servicing a document or while a document is out in the network.

Figure 3:
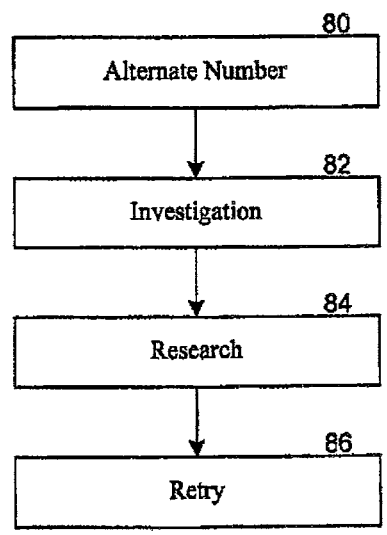
FIG. 3 is a high-level flow chart showing by way of example a hierarchy of four tables which are implemented as a rule-based process to determine the next action.

As a further specific embodiment, FIG. 3 illustrates a portion of a hierarchy rules list (decision tree) according to one embodiment disclosed herein. Four steps have been identified in the following sequence:
  alternate number 80;
  investigation 82;
  research 84;
  retry 86.

A document would go through these rules in the designated order. A more detailed description of the rules is set forth in FIGS. 4-13 and described below.

The following abbreviations are used in the figures described below:

| | |
|---|---|
| BC | broken connection |
| DAC | delivery analyst center (i.e., human operator) |
| BH | business hours |
| FBH | first business hours |
| LBH | lunch business hours |
| INV | investigation |
| WFPB | world fax phone book |
| HISTORICAL | record of past delivery information of all documents to a given destination number |
| DOCTRACT | record of delivery information for last delivery attempt (cycle) of this document |
| DOC | fax document |
| DN | document track notes |
| CST | current standard time for destination |
| TECH | technical |
| NW | network |
| NBH | non-business hours |
| BZ | busy |
| NO ALT | no alternative |
| PG | page |
| DES | delivery expert system |
| BC0/0 | broken connection with no page delivered |
| ALT # | alternate number |
| DA | delivery analyst |
| PBH | public business hours |
| OOS | out of service |

Figure 4A:
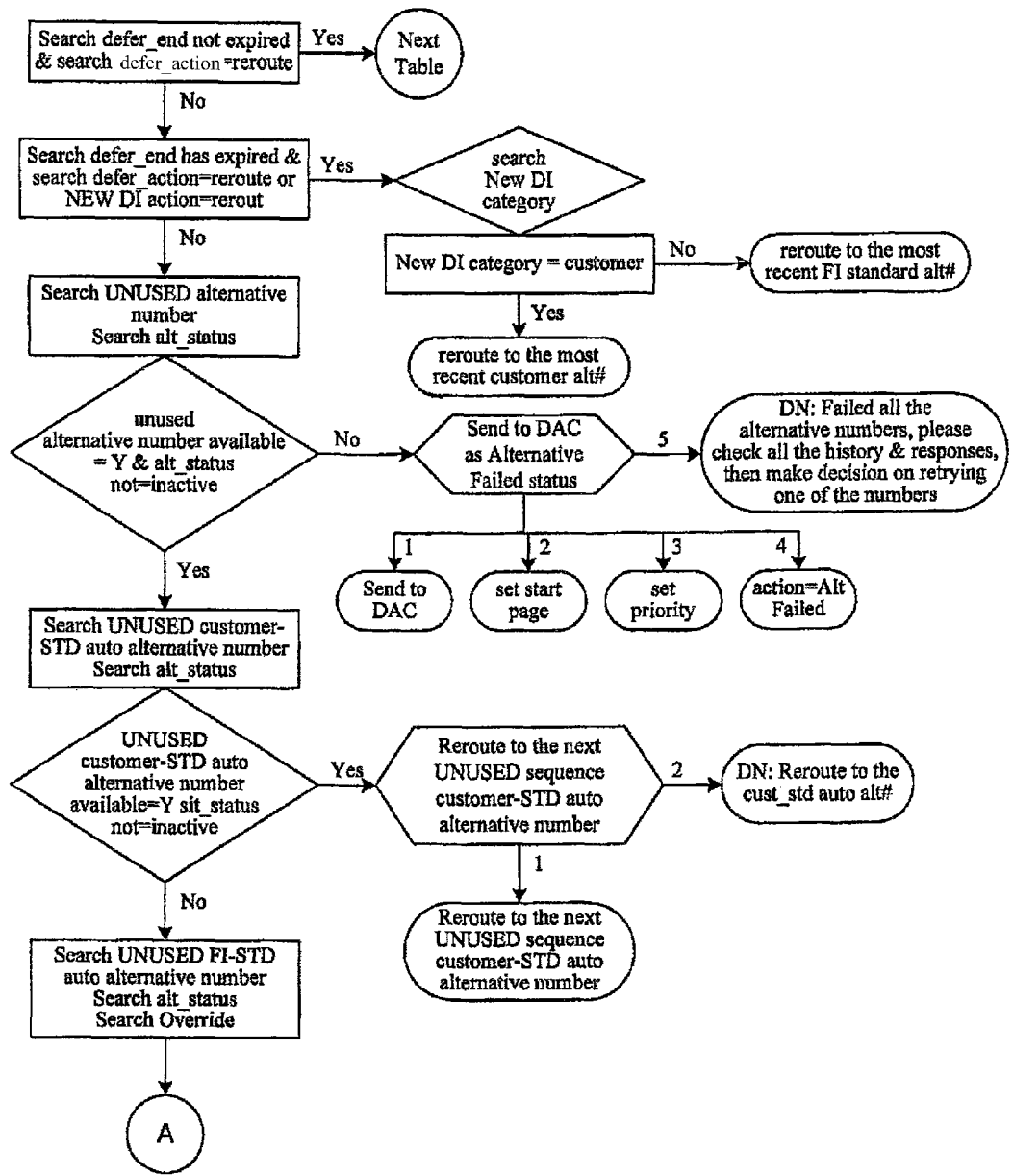
FIG. 4 is a more detailed flow chart of an alternative number table.
Figure 4B:
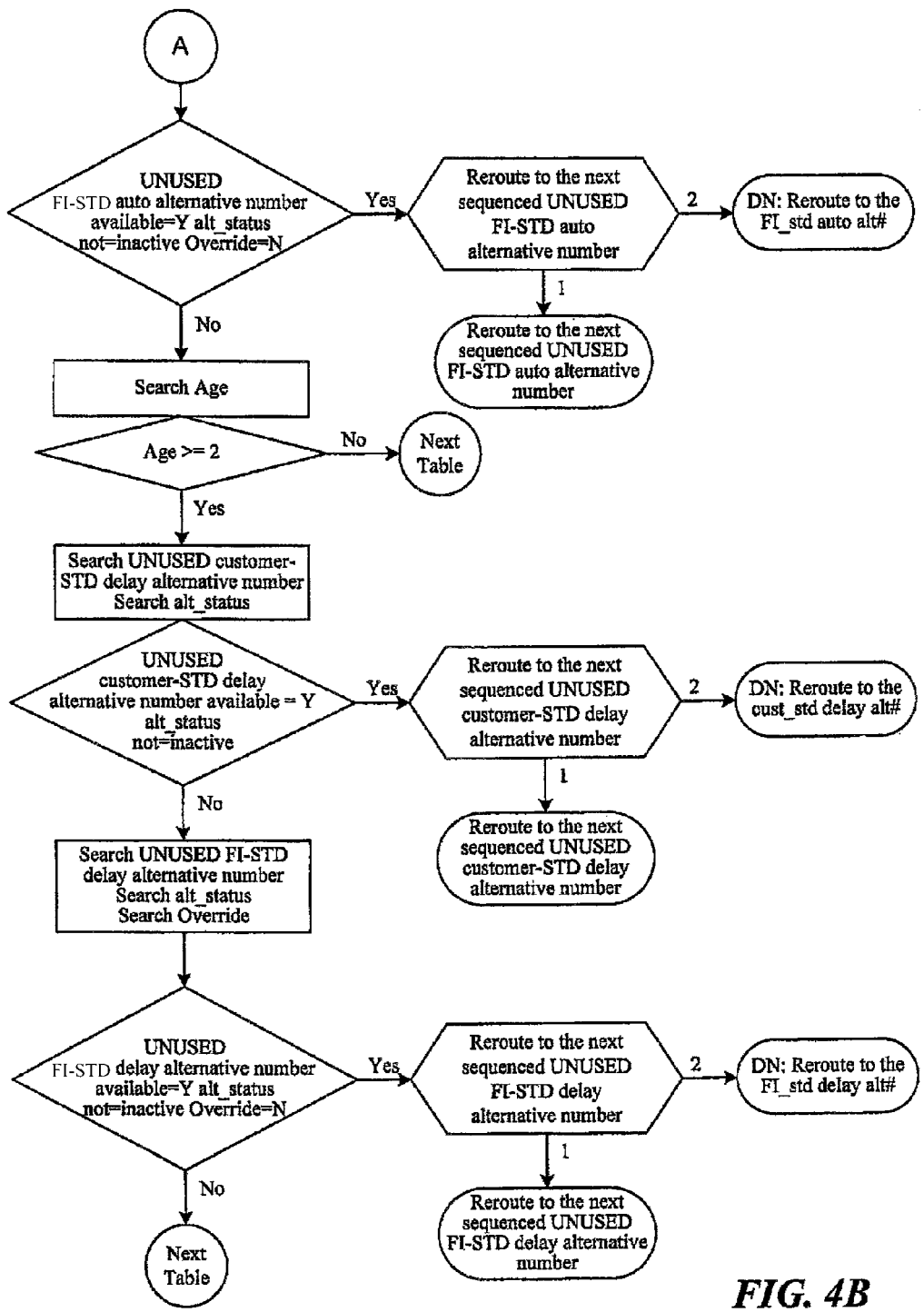

FIG. 4 illustrates the alternative number table, wherein the rules check the active destination number status, customer-provided alternative numbers, and network provided alternate numbers. In summary, FIG. 4 describes the following process:
1. Check for documents, of which alternate numbers with "Active" status have been used:
  send to DAC (human operator) so that DAC can make a decision on which number should be retried based on NW response and history of each number.
2. Check for documents with Active Alternate numbers which have not been used yet:
  If the retry time period is over and the next step after the retry time has been specified by the DAC (human operator) as "Reroute",
    reroute to the most recent alternate number.
  If a new alternate number is provided by a Customer or Network since a document came into the Network,
    reroute to the new alternate number immediately.
  If any automatic alternate numbers are provided by a customer or network previously,
    reroute to the customer-provided numbers in a consecutive order, and then reroute to network-provided numbers.
  If any delay alternate numbers exist, and two business hours since first retry have passed,
    reroute to the customer-provided numbers in a consecutive order, and then reroute to network-provided numbers.

Figure 5:
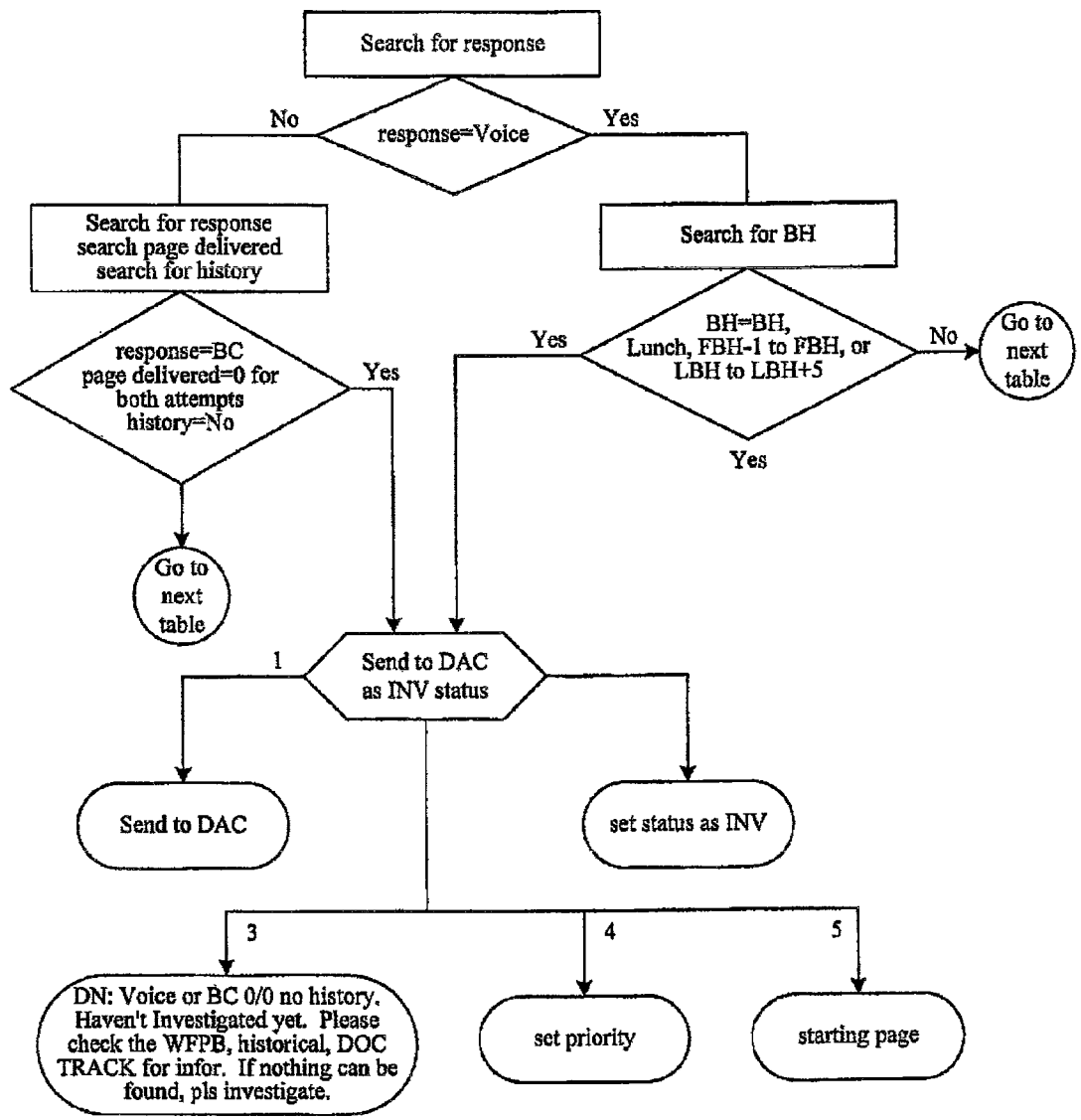
FIG. 5 is a more detailed flow chart of an investigation table.

FIG. 5 shows the investigation table which detects a voice response and a broken connection response. In summary, FIG. 5 describes the following process steps:
1. Check for NW response of Voice or Broken Connection with 0 pages delivered.
  For Voice response, check if the destination is open: destination hours are Business Hour, Lunch and Possible Business Hours.
  For Broken Connection Response, check if there is no history of previous delivery.
2. If above, send to DAC (human operator) to perform an Investigation Action. Based on the DAC's investigation result, DES will make an intelligent retry decision.

Figure 6A:
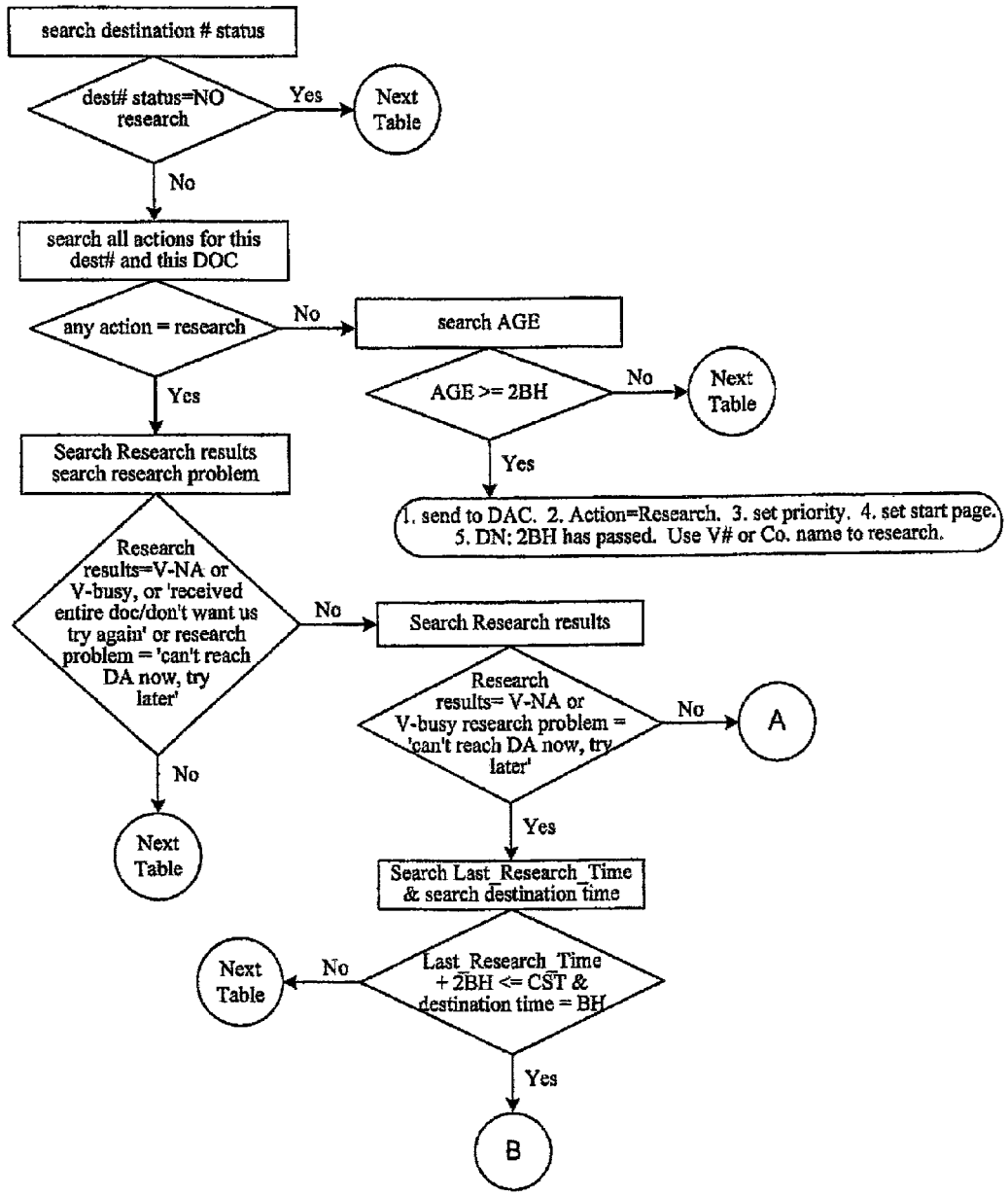
FIG. 6 is a more detailed flow chart of a research table.
Figure 6B:
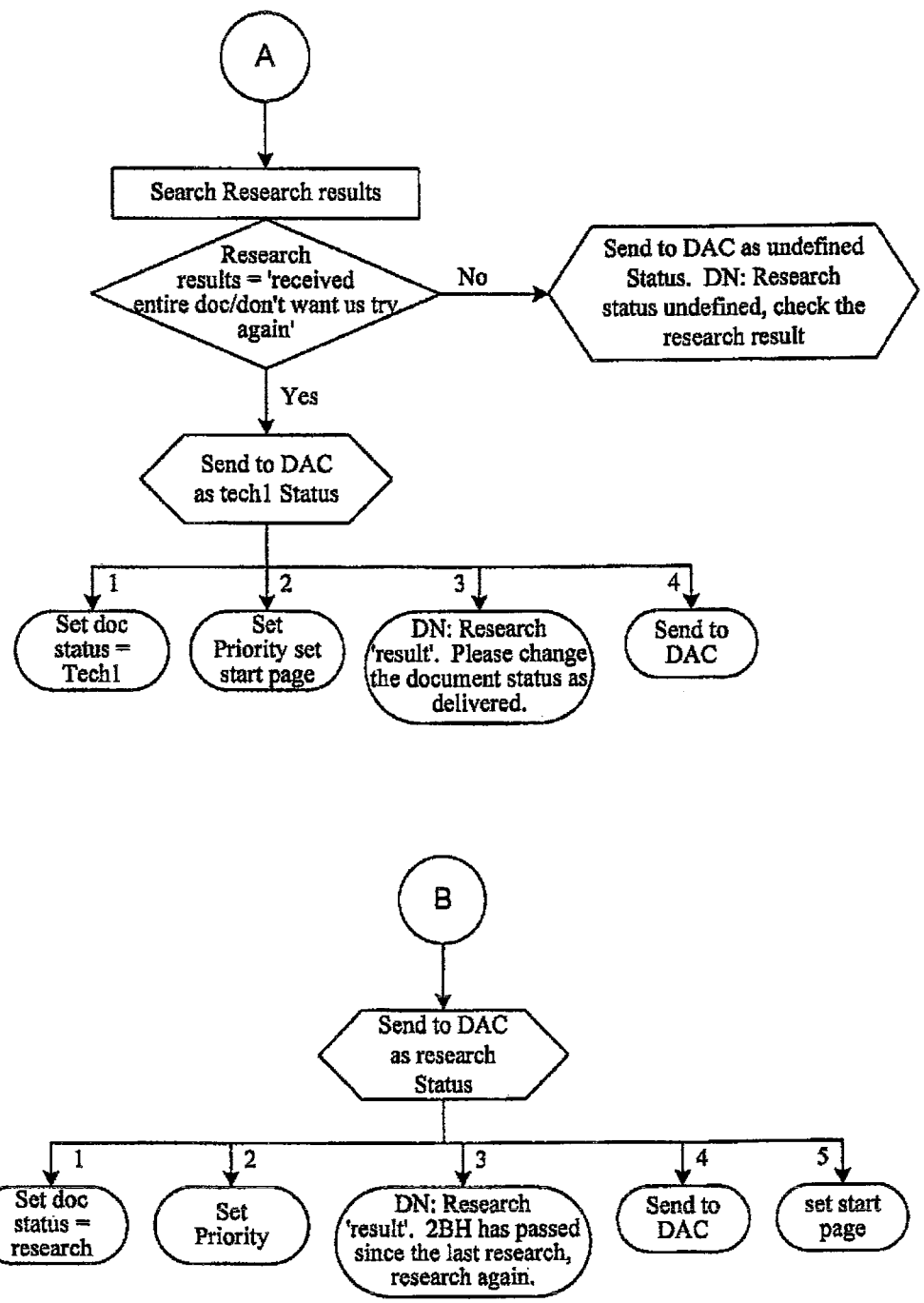

FIG. 6 is the research table showing the actions taken based on the research results. In summary, FIG. 6 describes the following process steps:
1. Check for a DA's Research Action in the previous cycles.
  If there is no Research Action found, check for documents that have been tried for two business hours or more.
    Send the found documents to DAC (human operator) to perform a Research Action.
  If there is a Research Action found, check for the research results in the previous cycles:
    If the result was no answer, busy, or "cannot reach information service", try two more hours and then send to DAC (human operator) to perform a Research Action again.
    If the result was "destination received the whole document already" or "destination does not want us to try again", send to DAC (human operator) to perform a Technical Action.
2. Based on the DAC's research results, DES will make an intelligent retry decision.

Figure 7:
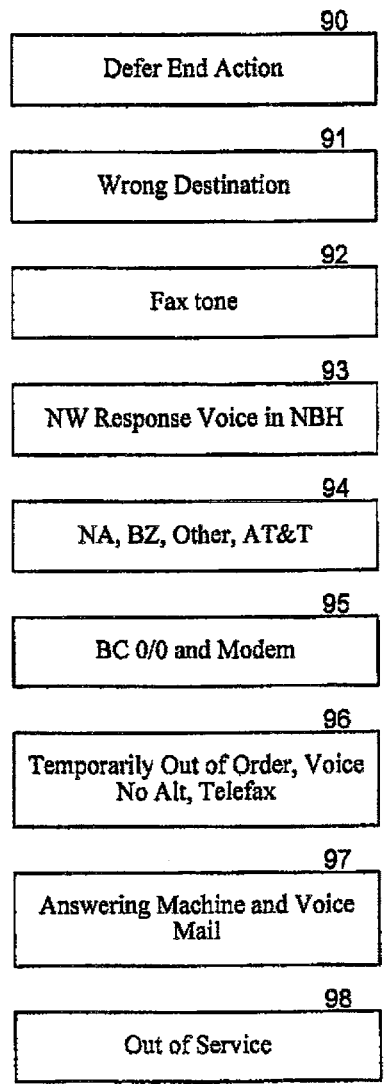
FIG. 7 is a flow chart summarizing the alternative steps of a set of intelligent retry tables.

FIG. 7 is a sequential list of the intelligent retry tables according to one embodiment, which includes:
  Defer End Action 90;
  Wrong Destination 91;
  Fax Tone 92;
  NW Response Voice in NBH 93;
  NA, BZ, Other, AT&T 94;
  BC 0/0 and Modem 95;
  Temporarily Out Of Order, Voice No Alt, Telefax 96;
  Answering Machine and Voice Mail 97;
  Out of Service 98.

The retry tables are described in greater detail in FIGS. 8-13.

Figure 8A:
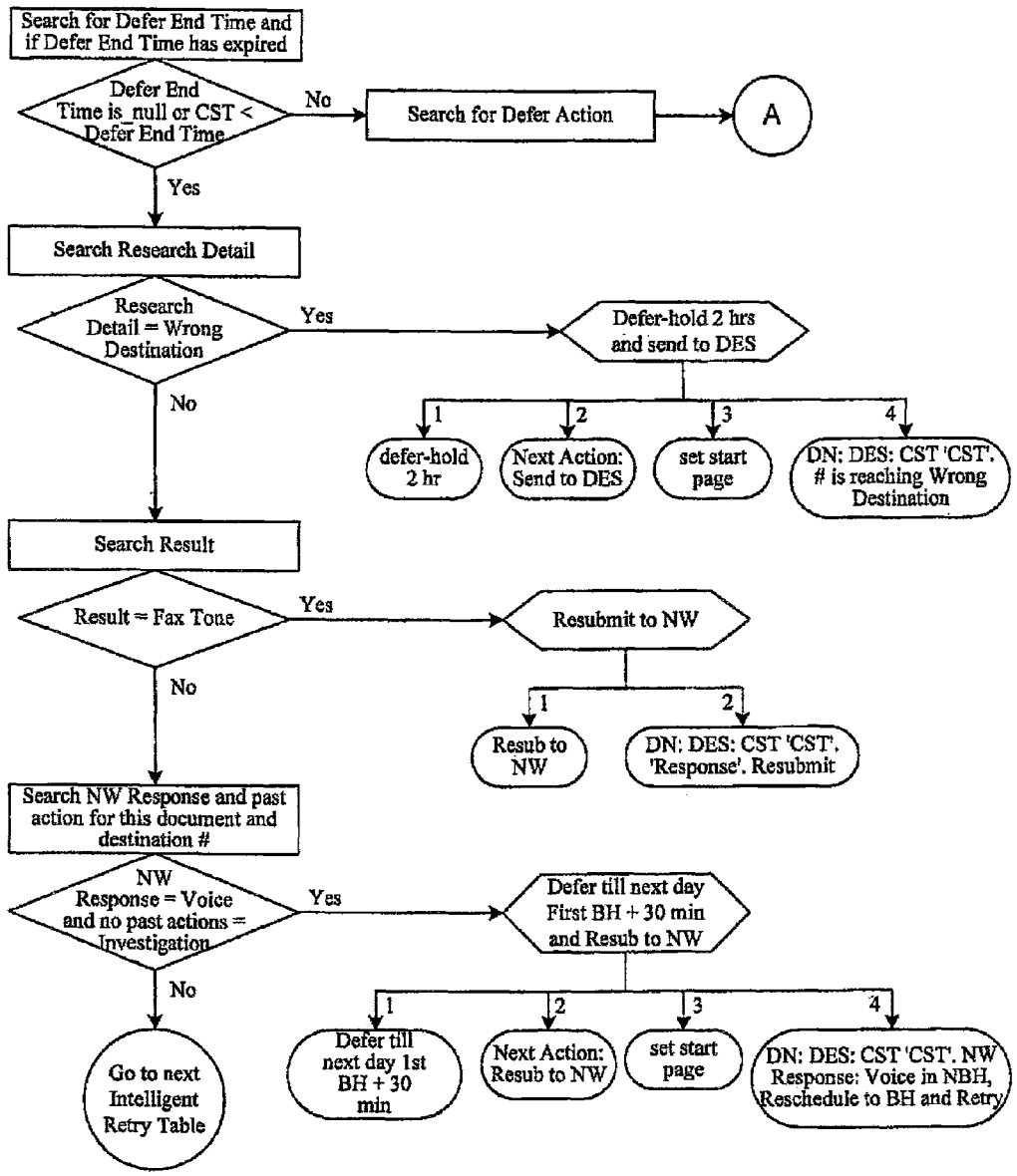
FIG. 8 is a more detailed flow chart of the intelligent retry table for "defer end, wrong destination, fax tone"
Figure 8B:
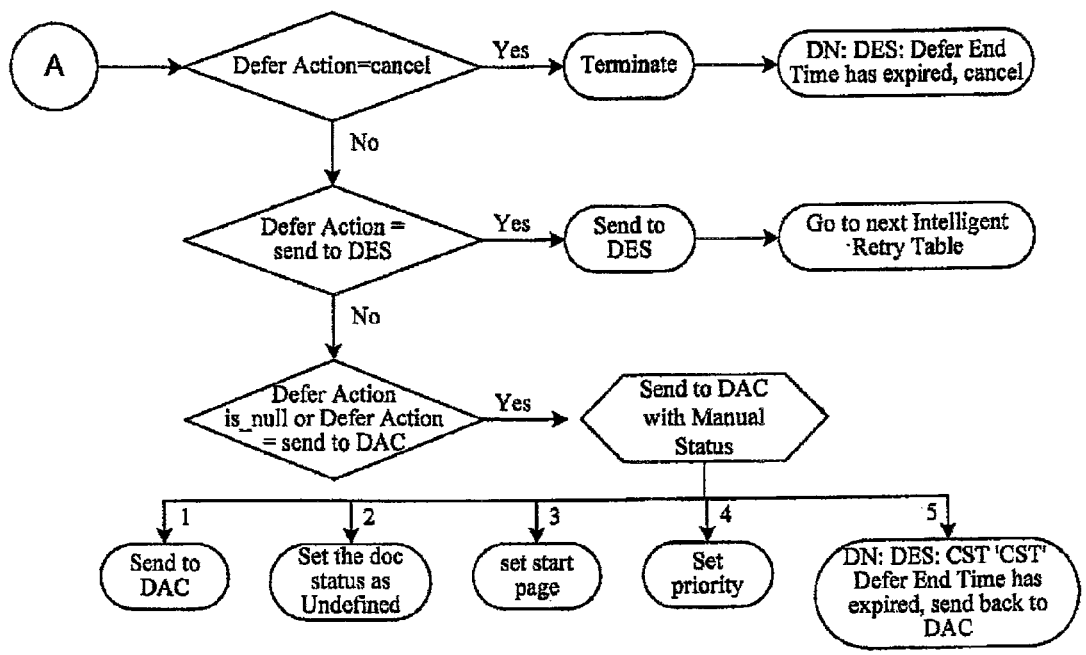

FIG. 8 shows the intelligent retry table for a deferred end action, a wrong destination, and a fax tone. In summary, FIG. 8 describes the following process steps:
1. Check for next step actions after the Defer End Time is over.
  If specified action at the Defer End time is "Terminate", terminate automatically.
  If specified action at the Defer End time is "Return to DES",
    send documents to DES so that DES can make an intelligent retry decision.

If specified action at the Defer End time is "Return to DAC",
send documents to DAC so that human operators can make a decision.
2. Check result of previous Research Actions.
If research result is wrong destination,
defer every two hours to check for the timing to provide communication services to the customer. If it's the time to provide, DES will send Action Reports of Delivery Instruction Request to Account Managers.
If research result is a fax tone,
resubmit to network immediately.
3. Check for NW Response of Voice and destination is closed:
defer until 30 minutes after the first business hour of the next day and retry again.

Figure 9A:
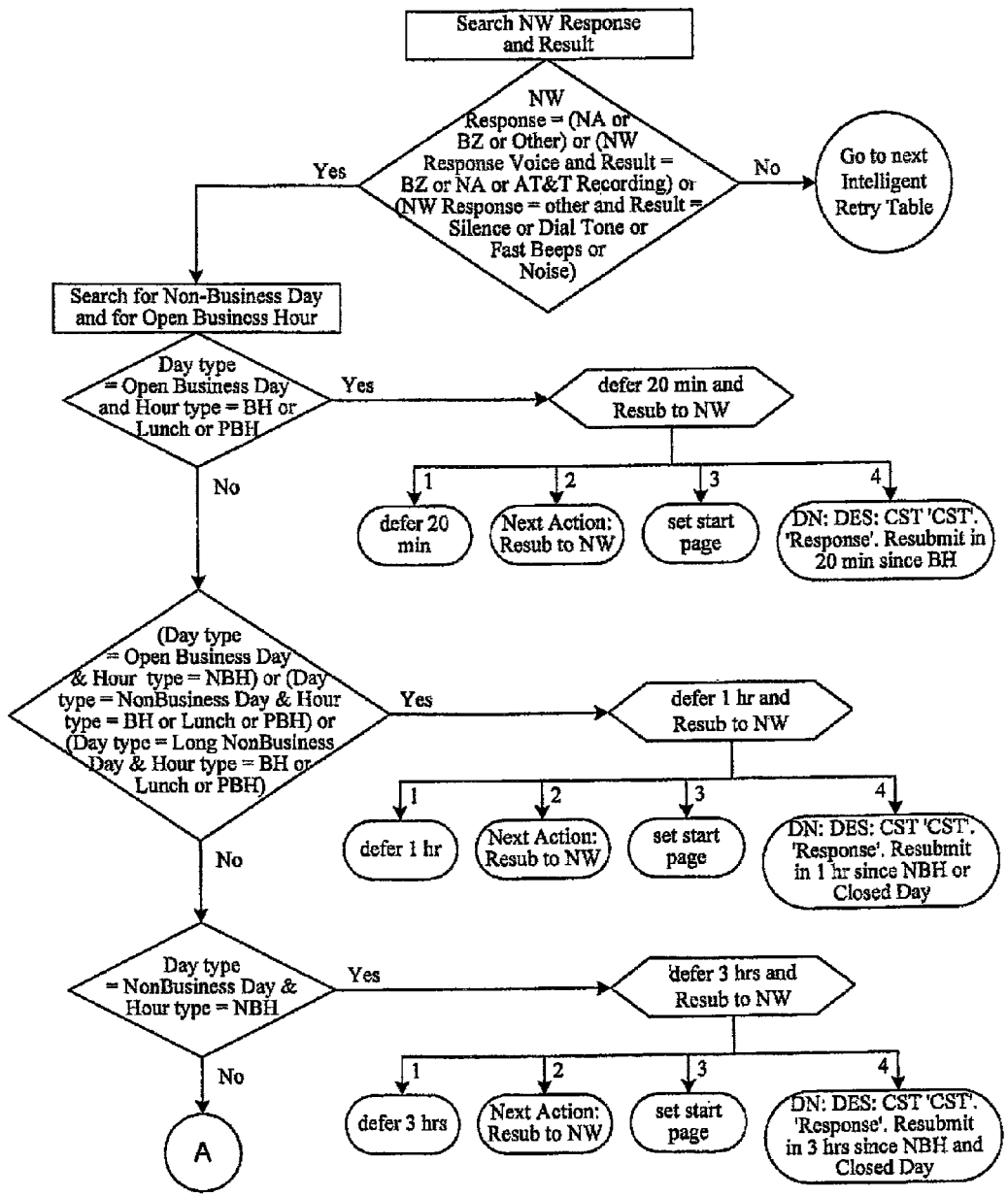
FIG. 9 is a more detailed flow chart of the intelligent retry table for "no answer and busy"
Figure 9B:
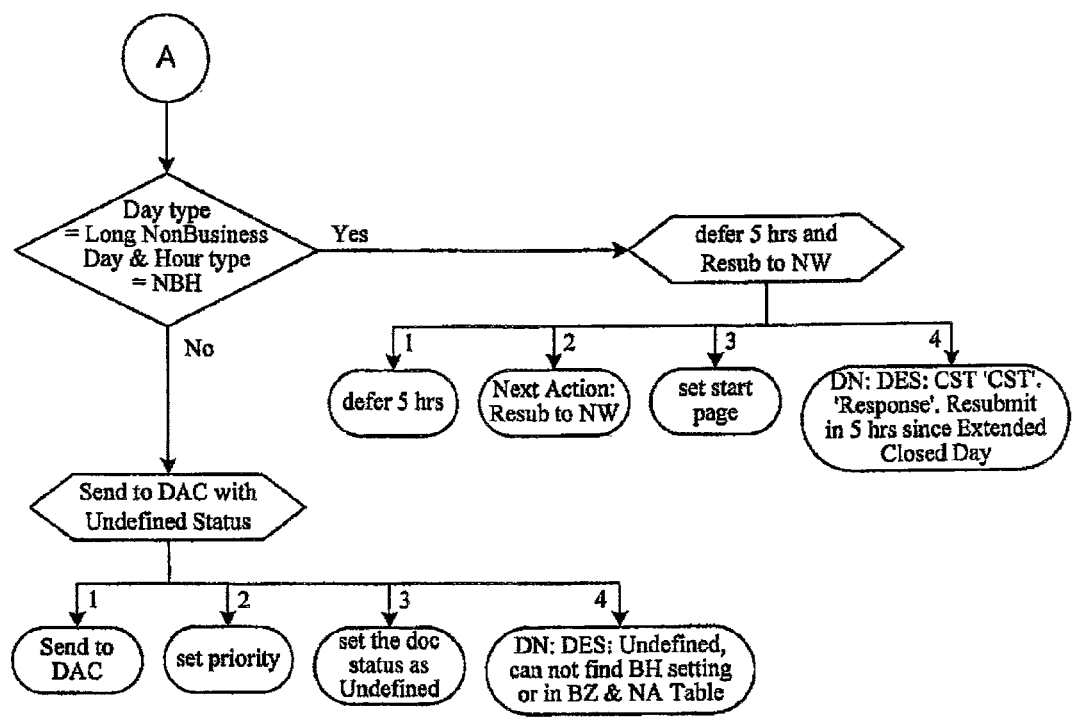

FIG. 9 describes the intelligent retry table for an NA or BZ response. In summary, FIG. 9 describes the following process steps:
1. Check for NW response of NA or BZ.
2. Check for Non Business Day and for Open Business Hour.
If the destination day and hour is following, defer twenty minutes and then retry.
Open Business Day and Business Hour, Lunch, or Possible Business Hour.
If the destination day and hour is following, defer one hour and then retry.
Open Business Day and Non Business Hour.
Non Business Day and Business Hour, Lunch, or Possible business Hour.
If the destination day and hour is following, defer three hours and then retry.
Non Business Day and Non Business Hour.
If the destination day and hour is following, defer five hours and then retry.
Long Non Business Day and Non Business Hour.

Figure 10A:
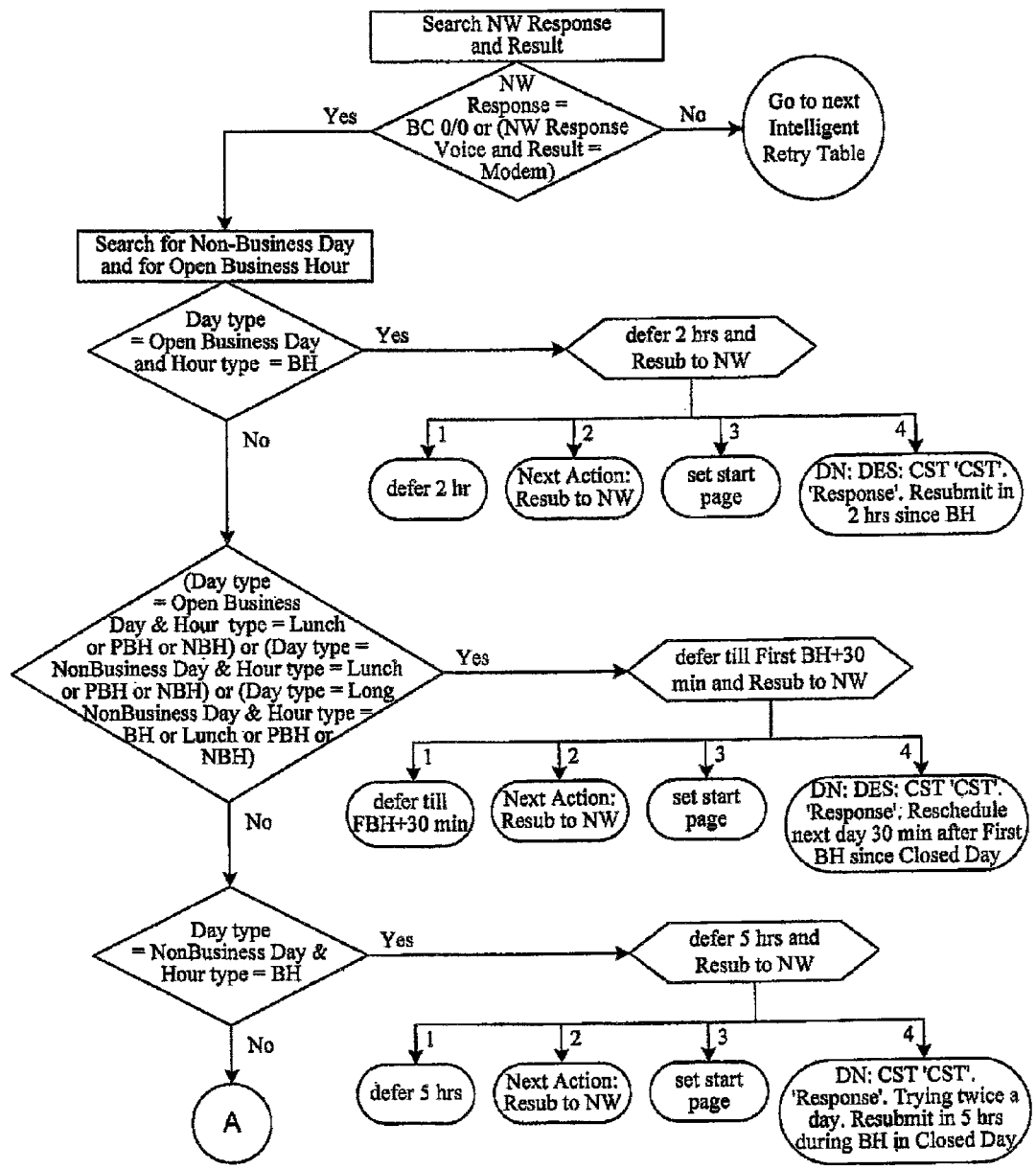
FIG. 10 is a more detailed flow chart for the intelligent retry table for "broken connection 0/0 and modem"
Figure 10B:
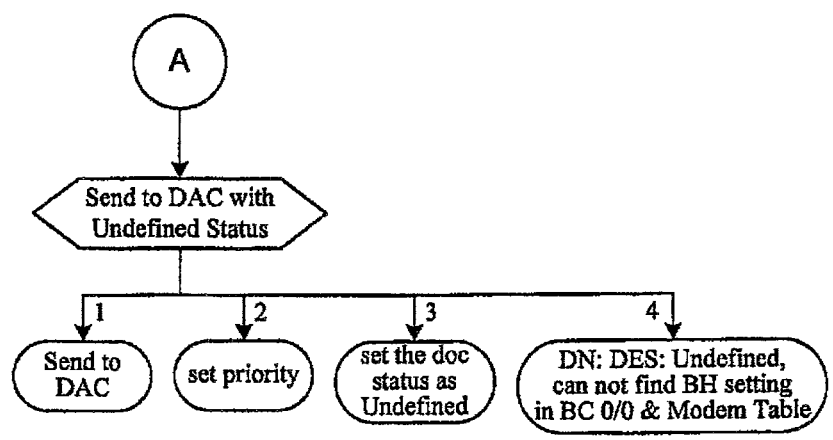

FIG. 10 illustrates the intelligent retry table for a broken connection or modem response. In summary, FIG. 10 describes the following process steps:
1. Check for NW response of Broken Connection with 0 page delivered or Voice with the investigation result of modem.
2. Check for Non-Business Day and for Open Business Hour.
If the destination day and hour are following, defer two hours and then retry.
Open Business Day and Business Hour.
If the destination day and hour are following, defer for 30 minutes after First Business hour and then retry.
Open Business Day and Non Business Hour;
Non Business Day and Non Business Hour (including lunch, and possible business hour); or
Long Non Business Day and all types of business hours (including business hour, lunch, possible business hour, and non business hour).
If the destination day and hour are following, defer five hours and then retry.
Non Business Day and Business Hour.

Figure 11A:
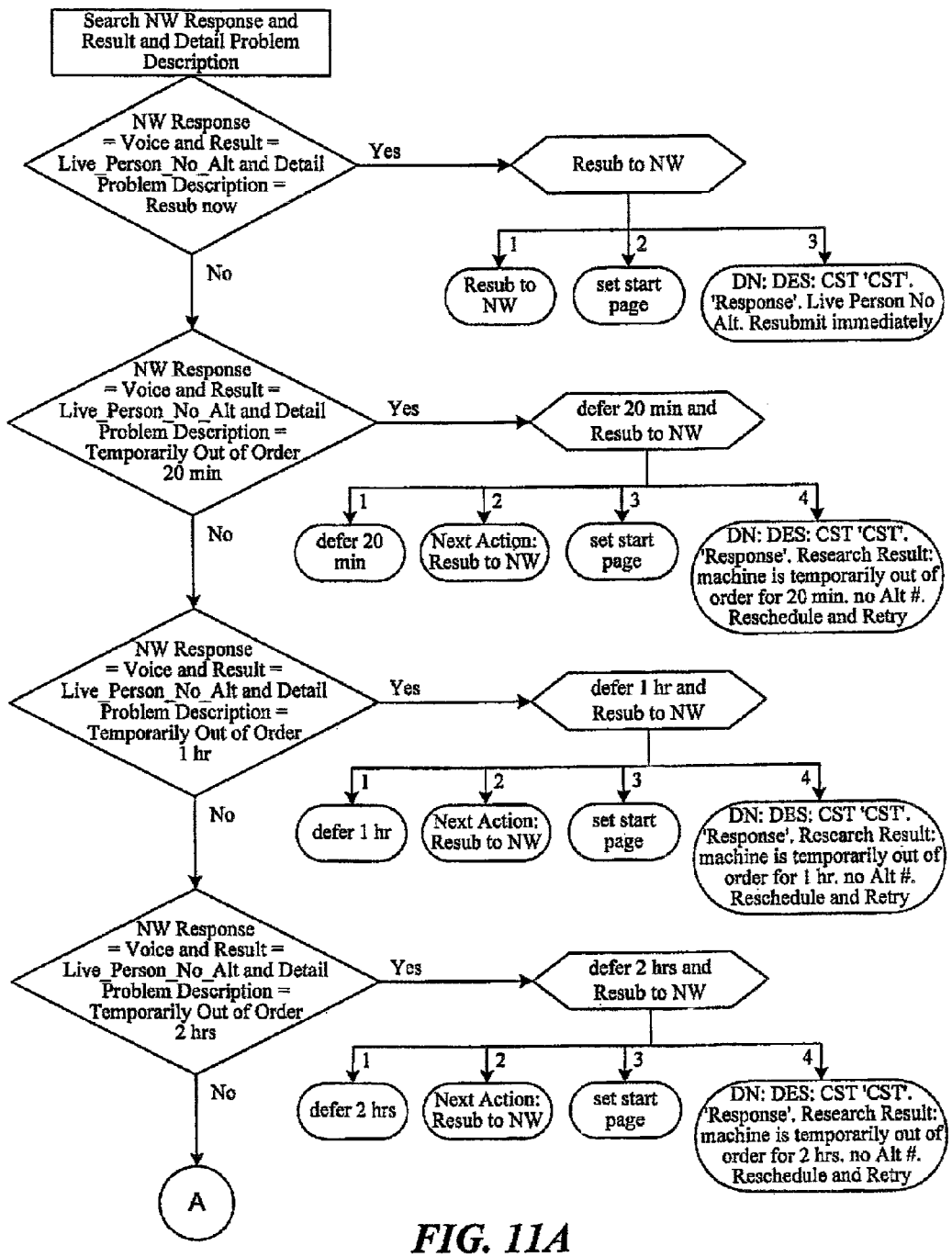
FIG. 11 is a more detailed flow chart of the intelligent retry table for "temporarily out-of-order, live person, no alternative, telefax"
Figure 11B:
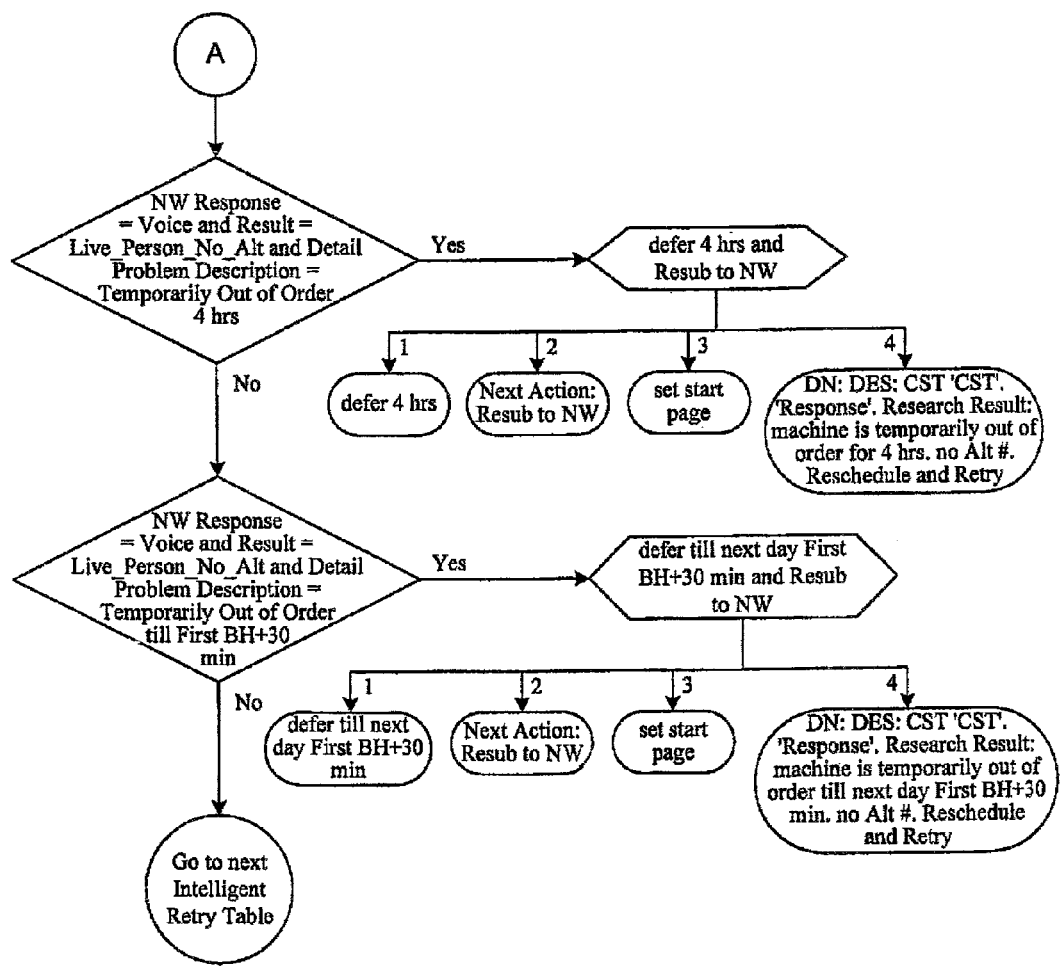

FIG. 11 is the intelligent retry table for a temporarily out of order, live person (with no alternative number) or a telefax response. In summary, FIG. 11 describes the following process steps:
1. Check for NW response of voice with the investigation result of Live Person (with no alternative number).
if the Detail Problem Description of the result is:
"Resubmit Now", retry now.
"Temporarily Out of Order for 20 minutes", defer 20 minutes and then retry.
"Temporarily Out of Order for 1 hour", defer one hour and then retry.
"Temporarily Out of Order for 2 hours", defer two hours and then retry.
"Temporarily Out of Order for 4 hours", defer four hours and then retry.
"Temporarily Out of Order until next day", defer till 30 minutes after First Business Hour and then retry.

Figure 12A:
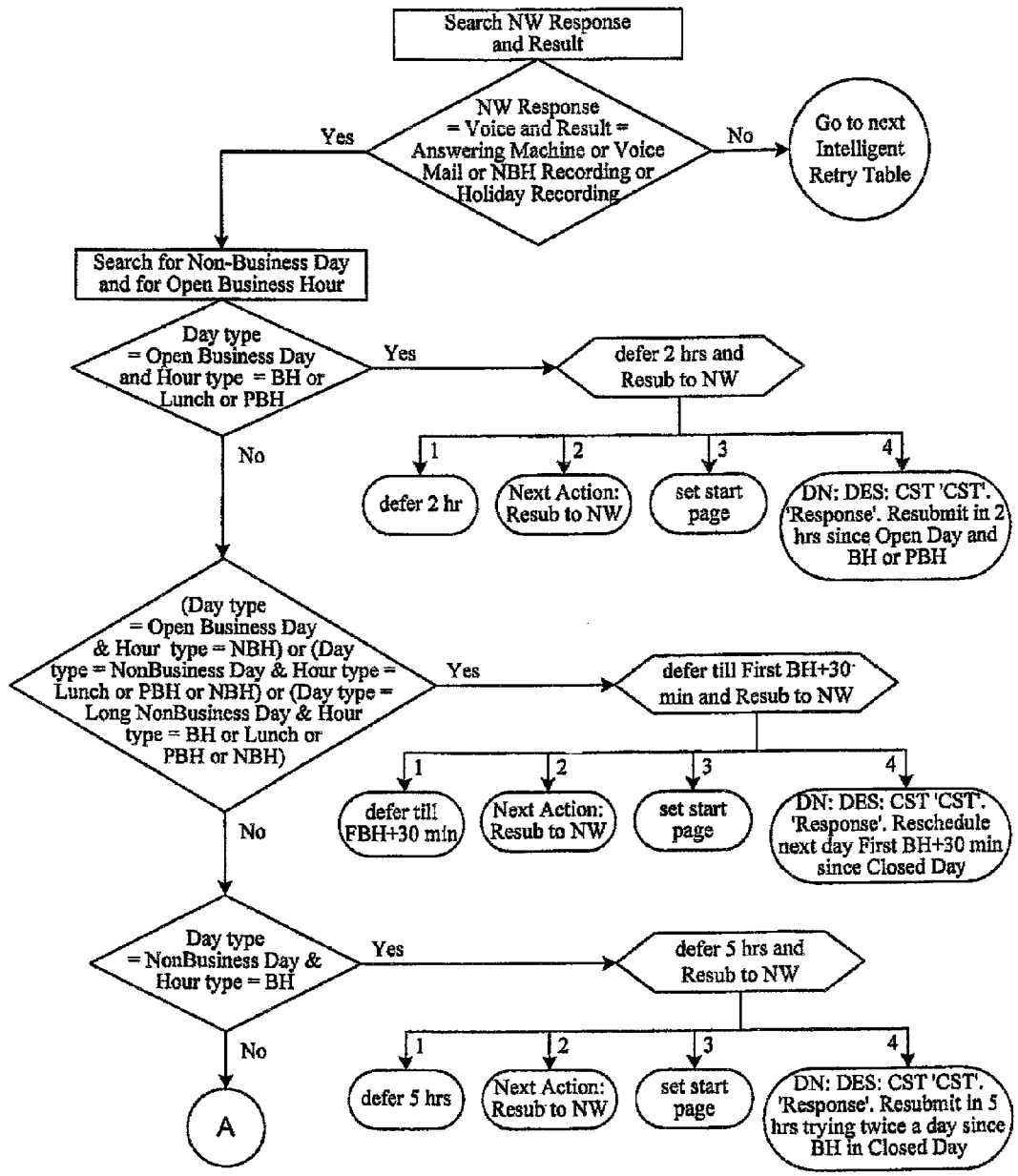
FIG. 12 is a more detailed flow chart of the intelligent retry table for "answering machine & voice mail"
Figure 12B:
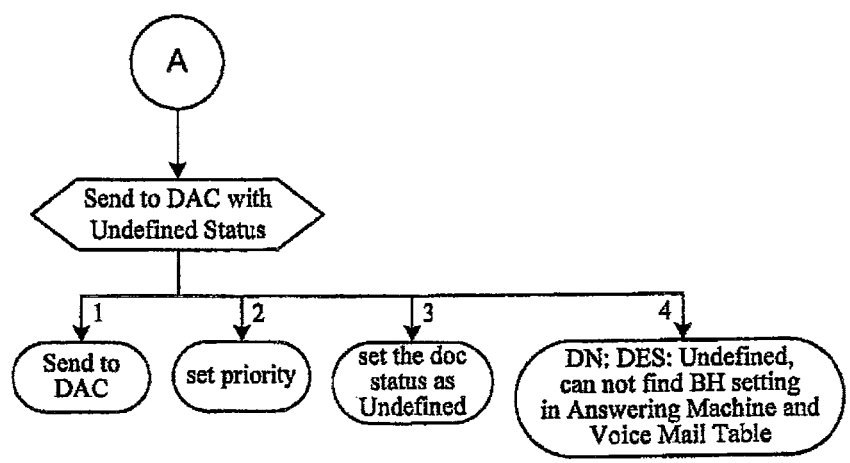

FIG. 12 is the intelligent retry table for an answering machine and/or voice mail response. In summary, FIG. 12 describes the following process steps:
1. Check for NW response of voice with the investigation result of Answering Machine or voice mail recording.
2. Check for Non Business Day and for Open Business Hour.
If the destination day and hour is following, defer two hours and then retry.
Open Business Day and Business Hour (including lunch, and Possible Business Hour).
If the destination day and hour is following, defer until 30 minutes after First Business Hour and then retry.
Open Business Day and Non Business Hour; or
Non Business Day (includes Long Non-Business Day) and Non Business Hour, Lunch, or Possible business Hour.
If the destination day and hour is following, defer five hours and then retry.
Non Business Day and Non Business Hour.

Figure 13A:
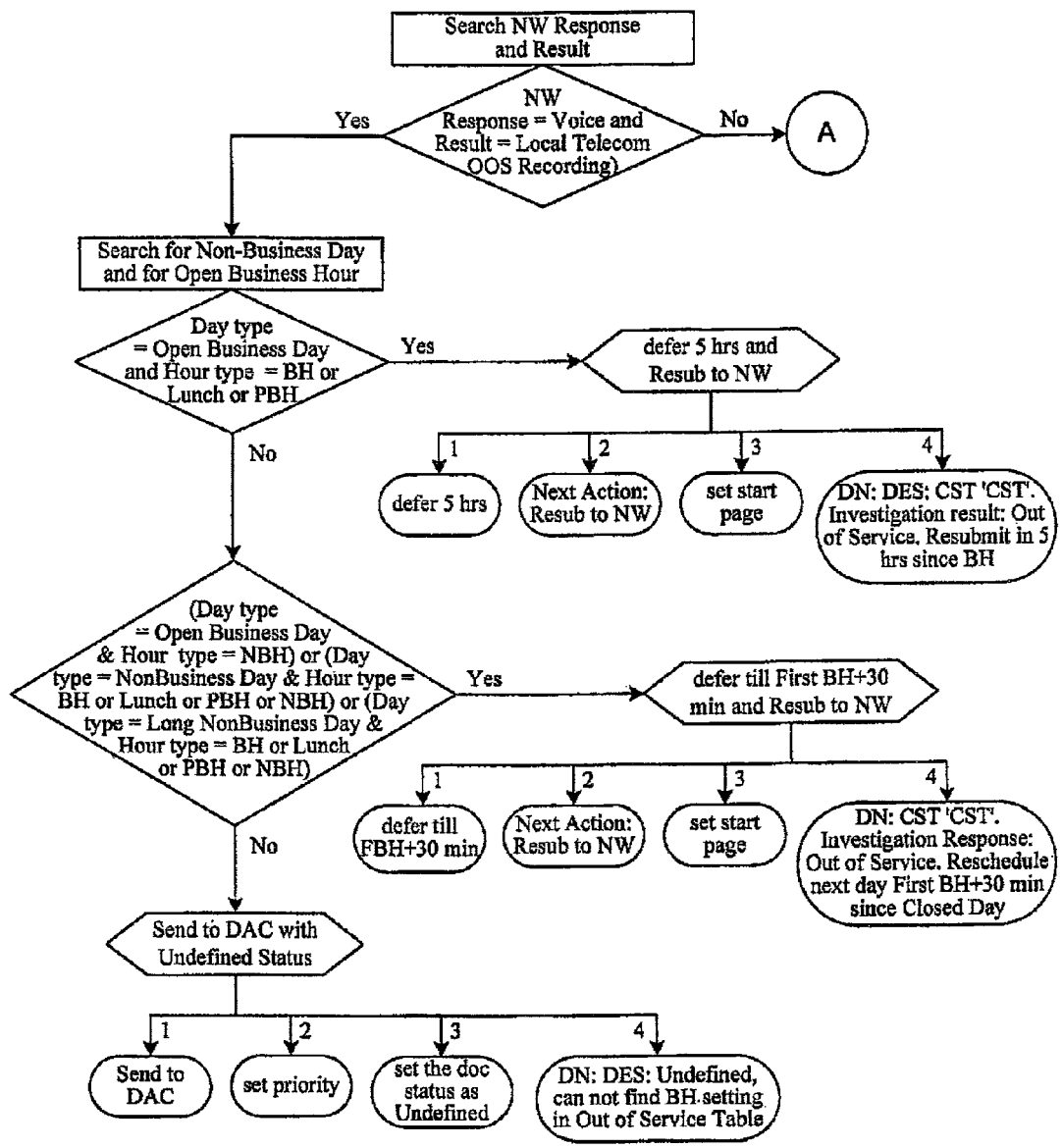
FIG. 13 is a more detailed flow chart for the intelligent retry table for "out-of-service"
Figure 13B:
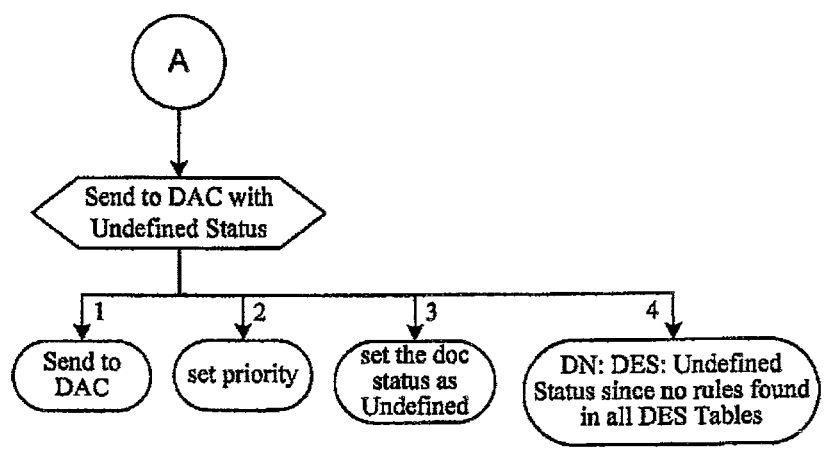

FIG. 13 is the intelligent retry table for an out of service response. In summary, FIG. 13 describes the following process steps:
1. Check for NW response of voice with the investigation result of Local Telecom Out of Service Recording.
2. Check for Non Business Day and for Open Business Hour.
If the destination day and hour is following, defer five hours and then retry.
Open Business Day and Business Hour, Lunch, or Possible Business Hour.
If the destination day and hour is following, defer until 30 minutes after First Business Hour and then retry.
Open Business Day and Non Business Hour;
Non Business Day of all types of business hours (including business hour, lunch, possible business hour, and non business hour); or
Long Non-Business Day and all types of business hours.

The functionality of the DES system can be achieved in software applications executing on standard PC platforms.

Figure 14:
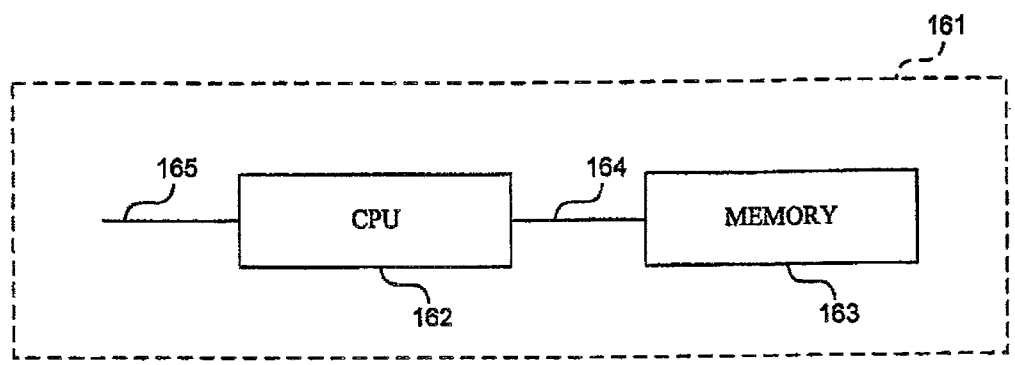
FIG. 14 is a block diagram illustrating a central processing unit and memory for use in this disclosure.

Various features of the invention may be implemented using a general purpose computer 161 as shown in FIG. 14. The general purpose computer may include a computer processing unit (CPU) 162, memory 163, a processing bus 164 by which the CPU can access the memory, and interface 165 to the network.

The invention may implement a memory, such as a floppy disk, compact disc, or hard drive, which contains a computer program or data structure, for providing to a general purpose computer instructions and data for carrying out the functions of the specific embodiment.

The parameters of the above process may be varied as desired to obtain a particular cycle time, i.e., a cycle being one pass through the rule-based process. For example, the number of retry attempts upon receipt of a busy, no answer, nonfax, voice or other signal can be predetermined and will effect the cycle time. Each cycle provides an opportunity for a change in the input conditions and thus a new rule-determined action (output) on the next cycle. A balance may be sought between the time per cycle and the number of cycles to maximize efficient resolution of most delivery assisted documents without extensive processing time or network overhead traffic.

In other embodiments, the system may be used for other message delivery such as delivery of E-mail (electronic mail) or voice mail over an S&F network. Thus, as used herein, the term document may include a fax document or other message such as an E-mail or voice mail message.

These and other modifications and improvements of the disclosure will be understood by a person skilled in the art and are intended to be included within the scope of the claimed invention.

The invention claimed is:

1. A method of facilitating delivery of a document from a source to a destination over a network when an initial delivery attempt has been unsuccessful, comprising:
at a server machine communicatively connected to the network:
initiating a rule-based process to determine a next action based on at least one input condition to the rule-based process, the next action being related to delivery of the document, wherein the at least one input condition comprises one or more of the following:
destination;
source;
past delivery attempts;
non-business time, day, or hour at the destination;
non-business time, day, or hour at the destination categorized by one or more of a country in which the destination is located, a region, and a destination number;
a response;
a cycle, the cycle being one pass through the rule-based process;
destination business hours;
a delivery instruction;
past action taken; and
alternative network tried.

2. A method according to claim 1, wherein the rule-based process at least retrieves information related to past attempts to deliver other documents to the destination.

3. A method according to claim 2, wherein the at least one input condition comprises at least a result from the past attempts to deliver other documents to the destination.

4. A method according to claim 1, wherein the document is at least one of an email message, a voice mail message, or a fax document.

5. A method according to claim 1, wherein rule-based instructions for the rule-based process are received at the server machine from the source before the initial delivery attempt.

6. A method according to claim 1,
wherein rule-based instructions for the rule-based process are received at the server machine from the source after the initial delivery attempt.

7. A method according to claim 6, wherein the rule-based instructions received at the server machine from the source are designated temporary.

8. A computer program product comprising at least one non-transitory computer readable medium storing instructions translatable by a computing device to perform:
after an initial delivery attempt of a document from a source to a destination over a network has been unsuccessful, initiating a rule-based process to determine a next action based on at least one input condition to the rule-based process, the next action being related to delivery of the document, wherein the at least one input condition comprises one or more of the following:
destination;
source;
past delivery attempts;
non-business time, day, or hour at the destination;
non-business time, day, or hour at the destination categorized by one or more of a country in which the destination is located, a region, and a destination number;
a response;
a cycle, the cycle being one pass through the rule-based process;
destination business hours;
a delivery instruction;
past action taken; and
alternative network tried.

9. A computer program product according to claim 8, wherein the rule-based process at least retrieves information related to past attempts to deliver other documents to the destination.

10. A computer program product according to claim 9, wherein the at least one input condition comprises at least a result from the past attempts to deliver other documents to the destination.

11. A computer program product according to claim 8, wherein the document is at least one of an email message, a voice mail message, or a fax document.

12. A computer program product according to claim 8, wherein rule-based instructions for the rule-based process are received at the computing device from the source before the initial delivery attempt.

13. A computer program product according to claim 8, wherein rule-based instructions for the rule-based process are received at the computing device from the source after the initial delivery attempt.

14. A computer program product according to claim 13, wherein the rule-based instructions received at the computing device from the source are designated temporary.

15. A computing system, comprising:
at least one processor; and
at least one non-transitory computer readable medium storing instructions translatable by the at least one processor to perform:
after an initial delivery attempt of a document from a source to a destination over a network has been unsuccessful, initiating a rule-based process to determine a next action based on at least one input condition to the rule-based process, the next action being related to delivery of the document, wherein the at least one input condition comprises one or more of the following:
destination;
source;
past delivery attempts;
non-business time, day, or hour at the destination;
non-business time, day, or hour at the destination categorized by one or more of a country in which the destination is located, a region, and a destination number;
a response;
a cycle, the cycle being one pass through the rule-based process;
destination business hours;
a delivery instruction;
past action taken; and
alternative network tried.

16. A computing system according to claim 15, wherein the rule-based process at least retrieves information related to past attempts to deliver other documents to the destination.

17. A computing system according to claim 16, wherein the at least one input condition comprises at least a result from the past attempts to deliver other documents to the destination.

18. A computing system according to claim 15, wherein the document is at least one of an email message, a voice mail message, or a fax document.

19. A computing system according to claim 15, wherein rule-based instructions for the rule-based process are received at the computing system from the source before the initial delivery attempt.

20. A computing system according to claim 15, wherein rule-based instructions for the rule-based process are received at the computing system from the source after the initial delivery attempt.

* * * * *